(12) United States Patent
Moore

(10) Patent No.: US 6,253,336 B1
(45) Date of Patent: *Jun. 26, 2001

(54) PREDICTING YEAR-2000 INSTRUCTION FAILURES

(75) Inventor: Brian B. Moore, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/137,465

(22) Filed: Aug. 20, 1998

(51) Int. Cl.[7] ........................................ G06F 17/30
(52) U.S. Cl. ........................ 714/38; 707/6; 713/200
(58) Field of Search ............................ 713/200; 707/6; 717/4, 5; 714/38

(56) References Cited

U.S. PATENT DOCUMENTS

| | | | |
|---|---|---|---|
| 5,446,876 | | 8/1995 | Levine et al. ................. 395/184.01 |
| 5,809,500 | * | 9/1998 | Nolan ................................. 707/6 |
| 5,897,633 | * | 4/1999 | Nolan ................................. 707/6 |
| 5,930,782 | * | 7/1999 | Shaughnessy ........................ 707/1 |
| 6,041,330 | * | 3/2000 | Carman et al. .................... 707/101 |
| 6,067,544 | * | 5/2000 | Moore ................................. 707/6 |
| 6,092,073 | * | 7/2000 | Coletti .............................. 707/101 |

OTHER PUBLICATIONS

T. Ball and J. R. Larus, Computer Science Department, University of Wisconsin—Madison, "Optimally Profiling and Tracing Programs", 1992, pp. 59–70.

J. Pierce and T. Mudge, University of Michigan, "IDtrace—A Tracing Tool for i486 Simulation", IEEE 1994, pp. 419–420.

J.E. Brown, The Computer Lawyer, "Year 2000—Achieving Year 2000 Compliance", vol. 15, No. 5, May 1998, pp. 1–5.

Hitachi Data Systems Publication, "RTX Environment—RTX Time Machine", http://www.hds.com/rtx/timemachine.html, (1998), pp. 1–4.

* cited by examiner

*Primary Examiner*—Ly V. Hua
(74) *Attorney, Agent, or Firm*—Lily Neff, Esq.; Heslin & Rothenberg, P.C.

(57) ABSTRACT

Object-code instruction traces are employed to analyze selected instructions of an application program for possible failure when confronted by a year-2000 date. The analysis includes directly identifying one or more instructions of the application program that may fail, as well as identifying whether the one or more instructions have a characteristic of a predefined false-positive failure pattern. A failure-pattern descriptor is assigned to each examined instruction which is indicative of whether the instruction may fail when confronted by a date in the year-2000 range, and whether the instruction is a possible false-positive failing instruction. The analysis employs user-specifiable run-control values, as well as predetermined filter-specification values in comparing traces of each selected object-code instruction to predefined instruction failure patterns.

27 Claims, 9 Drawing Sheets

```
LOADMOD.CSECT.OFFSET: SUITE15 .SUITE15. 00005F58.  CLC D503D4E0D4E8.  PASS/REJECT     30/
1AB H (CATALOG).  CLC G2 DEC 002 (BOTH   ).  FILTER PASSED 96.8% (        30).  FFI 00005.
TRUE/COMP DATES:                   30/                        30PD
  OP1: RANGE     000227+ TO     991230+.   YY DECADE % 20   0   0   0  17   0   7   0   0   57.   Y2K=20.0%
  OP2: RANGE     000227+ TO     950115+.   YY DECADE % 60   0   0   0   0   0   0   3   0   37.   Y2K=60.0%
  Y2K FAILURES            12.     FUT Y2K FAILURES            11.

LOADMOD.CSECT.OFFSET: SUITE15 .SUITE15. 00008156.  SP FB1D4AE8802.  PASS/REJECT     31/
1AB A (CATALOG).  SUB YY    031 (INT2    ).  FILTER PASSED ALL  (        31).  FFI 00022.
  OP1: RANGE     000000+ TO     000099+.   YY DECADE % 19   0   0   0  16   0   6   0   0   58.   Y2K=19.4%
  OP2: CONSTANT                  000001+.                                                         Y2K=   %
  Y2K FAILURES             4.     FUT Y2K FAILURES            23.

LOADMOD.CSECT.OFFSET: SUITE15 .SUITE15. 00008244.  MP FC42DABB7DE.  PASS/REJECT     31/
1AB A (CATALOG).  MUL YY    051 (MPRE    ).  FILTER PASSED ALL  (        31).  FFI 00028.
  OP1: RANGE     000000+ TO     000099+.   YY DECADE % 19   0   0   0  16   0   6   0   0   58.   Y2K=19.4%
  OP2: CONSTANT                  036525+.                                                         Y2K=   %
  Y2K FAILURES             6.     FUT Y2K FAILURES            23.

LOADMOD.CSECT.OFFSET: SUITE15 .SUITE15. 00008474.  CLC D50D4E0C01C.  PASS/REJECT    45/
1B00A (CATALOG).  CLC YY DEC 001 (BOTH   ).  FILTER PASSED ALL  (        46).  FFI 00004
TRUE/COMP DATES:                   46/                        46 ZO
  OP1: RANGE     000000+ TO     0000099+.  YY DECADE % 61   0   4   8  11   0   0   0   0   24.   Y2K=50.0%
  OP2: CONSTANT                  000000+.                                                         Y2K=100.0%
  Y2K FAILURES            15.     FUT Y2K FAILURES             0.
``` fig. 7

```
LOADMOD.CSECT.OFFSET: SUITE15 .SUITE15. 000037A0.  SP F810D4E0880D2. PASS/REJECT         46/
2H89A (CATALOG).    SUB YY    030 (INT2   ).  FILTER PASSED ALL   (     46). FFI 00022.
  OP1: RANGE      000026+ TO   000076+.     YY DECADE % 0  0  83  0  0  0  0  17   0   0.   Y2K=0.0%
  OP2: CONSTANT                000001+.                                                     Y2K=
  Y2K FAILURES         0.      FUT Y2K FAILURES        0.

LOADMOD.CSECT.OFFSET: SUITE15 .SUITE15. 0000472C.  SP FB10D4E00002. PASS/REJECT         36/
2KONA (CATALOG).    SUB YY    030 (INT2   ).  FILTER PASSED ALL   (     36). FFI 00022.
  OP1: CONSTANT                000080+.                                                     Y2K=0.0%
  OP2: CONSTANT                000001+.                                                     Y2K = %
  Y2K FAILURES         0 .     FUT Y2K FAILURES       36.

LOADMOD.CSECT.OFFSET: SUITE15 .SUITE15. 00006FBC.  SP FB10D4E08802. PASS/REJECT      4,974/
2S12A (CATALOG).    SUB YY    030 (INT2   ).  FILTER PASSED ALL   (  4,974). FFI 00022.
  OP1: RANGE      000001+ TO   000012+.     YY DECADE % 75  25  0  0  0  0  0  0   0   0.   Y2K=33.3%
  OP2: CONSTANT                000001+.                                                     Y2K= %
  Y2K FAILURES         0.      FUT Y2K FAILURES        0.

LOADMOD.CSECT.OFFSET: SUITE15 .SUITE15. 00007042.  A  5A28815C  .       PASS/REJECT      5,392/
2TACA (CATALOG).    ADD YY    033 (INTE    ).  FILTER PASSED ALL   (  5,392). FFI 00025.
  OP1: RANGE      000000+ TO   000024+.     YY DECADE % 38  38  23  0  0  0  0  0   0   0.  Y2K=23.1%
  OP2: CONSTANT                000002-.                                                     Y2K= %
  Y2K FAILURES       418.      FUT Y2K FAILURES        0.
``` fig. 8

PREDICTING YEAR-2000 INSTRUCTION FAILURES

CROSS-REFERENCE TO RELATED APPLICATIONS

This application contains subject matter which is related to the subject matter of the following applications, each of which is assigned to the same assignee as this application and filed on the same day as this application. Each of the below-listed applications is hereby incorporated herein by reference in its entirety:

"METHOD FOR PREDICTING YEAR-2000 INSTRUCTION FAILURES," by Brian B. Moore, U.S. Ser. No. 09/136,833 now U.S. Pat. No. 6,067,544; and "SYSTEM FOR PREDICTING YEAR-2000 INSTRUCT ON FAILURES," by Brian B. Moore, U.S. Ser. No. 09/136,279.

TECHNICAL FIELD

The present invention relates generally to computer system diagnostics and, in particular, to a computer-implemented capability for detecting and predicting the presence of individual year-2000 instruction failures within a compiled computer program.

BACKGROUND OF THE INVENTION

Computer systems used in various processing applications, such as processing insurance information, account information, inventory information, investment information, retirement information, as well as many other applications, often operate with records and data containing date-dependent information. In many computing systems, date information relating to years has been represented in two-digit year format, wherein the two digits represent a year between 1900 and 1999. Thus, for example, the digits "98" would represent the year 1998. Popular usage of this simplified date information format throughout the computer industry has resulted in an industry-recognized problem, often referred to as the "year 2000 problem" or the "y2k" problem.

The problem results from this simplification of date information. Namely, upon the turn-of-the-century (i.e., year 2000) two-digit year information intended to represent a year within the 21st Century will be indistinguishable within such computer systems from a year within the 20th Century. For example, a two-digit year value of "08" which is intended to represent the year 2008 will be indistinguishable from the year 1908 by such systems. More specifically, year-2000 problems occur when calculations cross the year-2000 boundary. For example, calculating two years beyond the year 1999 (represented as "99") yields an arithmetically correct result of 101, but a computer program may truncate this to 01 since only two digits have traditionally been allowed. As a further example, the comparison of the year 1999 (represented as "99") against 2000 (represented as "00") may yield the result that a date in the year 1999 is after (i.e., arithmetically greater) than the year 2000.

Various solutions to the "year-2000 problem" have been suggested. Defining the term "year-2000 compliant" as the ability to recognize accurately dates both before and after Jan. 1, 2000, there are essentially four methods of achieving software compliance that have been commonly recognized. They are: (1) date expansion; (2) clock modification; (3) windowing; and (4) date modification. Briefly described "date expansion" directs a user to survey each computer program and database to identify every location where dates or equivalent data compressions are in use and reformat each instance to use four instead of two digits. "Clock modification" involves changing all years in an existing database and the system clock by deducting 28 years. The reason for the use of 28 is that the calendar resets itself completely every 28 years. The "windowing" technique assumes the century of a two-digit year by comparing it to an arbitrary window of 100 years. Finally, "date modification" involves changing the symbolic system used to represent different years so as to accommodate more than the traditional 100 numbers in the two digits allocated for that purpose. For example, letters of the alphabet can be selectively substituted for numbers to expand the representation of the two digits.

The above-summarized tools currently used in the year-2000 remediation efforts are predominantly source-based and focus on identifying date variables. For example, the variable names in the application source code are examined seeking names that contain date-related parts such as YEAR, YR, YY, MONTH, MM, DAY, DD, DDD, etc. Such tools list all variables and indicate which statements possess them, however, they often miss any date variable that has a non-descriptive or obscure name, and they do not indicate which instructions will fail when confronted by year-2000 dates.

Therefore, a need exists in the "y2k problem" art for a new technique for identifying specific object-code instructions that may fail when confronted by a year-2000 date, instead of identifying source statements that process such dates, and secondly, for such a technique which does not rely on the use of appropriate variable names to identify the dates, but rather uses execution characteristics of the data itself.

DISCLOSURE OF THE INVENTION

Briefly described, the invention comprises in one aspect an article of manufacture which includes at least one computer usable medium having computer readable program code means embodied therein for causing evaluating of instructions of an application program. The computer readable program code means in the article of manufacture includes computer readable program code means for causing a computer to effect: evaluating an instruction of the application program to identify whether the instruction may fail when confronted with a year-2000 date, the evaluating including employing execution characteristics embodied by at least one trace record of the instruction in a trace file produced from execution of the instruction; and assigning a failure-pattern descriptor to the instruction of the application program if the evaluating determines that the instruction may fail when confronted by the year-2000 date, the failure-pattern descriptor being useful in bringing the application program into year-2000 compliance.

In another aspect, an article of manufacture is provided which includes at least one computer usable medium having computer readable program code means embodied therein for causing evaluating of instructions of an application program. The computer readable program code means in the article of manufacture includes computer readable program code means for causing a computer to effect: evaluating an instruction of the application program to identify whether the instruction may fail when confronted with a year-2000 date; determining whether the instruction has a characteristic of a predefined false-positive pattern; and assigning a failure-pattern descriptor to the instruction of the application program if the computer readable program code means for causing a computer to effect evaluating determines that the instruction may fail when confronted by the year-2000 date, wherein the failure-pattern descriptor is indicative of a possible false-positive instruction when the computer readable program code means for causing a computer to effect determining determines that the instruction has the characteristic of the predefined false-positive pattern, wherein the failure-pattern descriptor is useful in bringing the application program into year-2000 compliance.

In a further aspect, an article of manufacture is provided which includes at least one computer usable medium having computer readable program code means embodied therein for causing evaluating of object-code instructions of an application program. The computer readable program code means in the article of manufacture includes computer readable program code means for causing a computer to effect: providing at least one of a run-control value and a filter-specification value for use in evaluating an object-code instruction of the application program; and evaluating the object-code instruction of the application program to identify whether the instruction may fail when confronted with a year-2000 date, the evaluating including employing at least one of the run-control value and the filter-specification value in determining whether the instruction may fail when confronted with the year-2000 date.

To restate, a detection technique in accordance with the present invention analyzes object-code instruction traces, and therefore fills a void not presently being addressed by source-based tools. The object-code instruction traces are used to identify instructions that may fail when confronted by year-2000 dates instead of identifying all statements that process such dates, and secondly, does not rely on the use of an appropriate variable name or names to identify the dates. Rather, the present invention employs execution characteristics of the data itself.

Thus, a post-processor implementation in accordance with the present invention complements and augments the software remediation approaches currently in use and provides another tool for analyzing and addressing the year-2000 problem for a given program. Further features of the invention include allowing a user to affect the analysis by setting run-time control values that reflect individual aspects of the application being tested. Special flags can also be set to winnow out false-positives instead of merely identifying instructions that seem to possess date variables. Identifying possible false-positive instructions will expedite the analysis task left to a remediation team. A post-processor in accordance with the present invention further identifies failures associated with performing arithmetic or comparisons on full Julian and Gregorian variables, instead of merely focusing on two-digit year variables. Thus, a wider set of failures can be identified. Further, the present invention can identify failures in compare, subtract, add, and multiply instructions, as well as compare logic (CLC) instructions that compare zoned-decimal, packed-decimal, and binary operands. Again, allowing a wider set of failures to be identified.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 7 is a sample data output in accordance with the present invention showing multiple instructions found to exhibit year-2000 failures; and FIG. 8 is a sample data output in accordance with the present invention noting multiple instructions with potential false-positive year-2000 attributes.

BEST MODE FOR CARRYING OUT THE INVENTION

As introduced above and explained in detail below, this invention provides a technique for analyzing object-code instructions of an application program employing trace records accumulated from execution of the instructions. By analyzing object-code instruction traces, instructions that will or may fail when confronted by year-2000 dates are directly identified, which is contrasted with prior approaches of scanning source code for statements that process dates subject to the year-2000 problem. Along with identifying instructions that will fail, an analysis in accordance with this invention identifies instructions that might fail when processing dates in the year-2000 range and provides a catalog identifier to each instruction. The catalog identifiers reference a table of failure-pattern descriptions. In an embodiment described herein, these failure-pattern descriptions include a characterization of the year-2000 failure potential along with an aspect of a predefined false-positive where appropriate. The catalog identifiers and other execution summary information (described below) can then be employed, for example, by a remediation team, to design a proper fix to the application program, test the program and return the remediated application to production.

Figure 1:
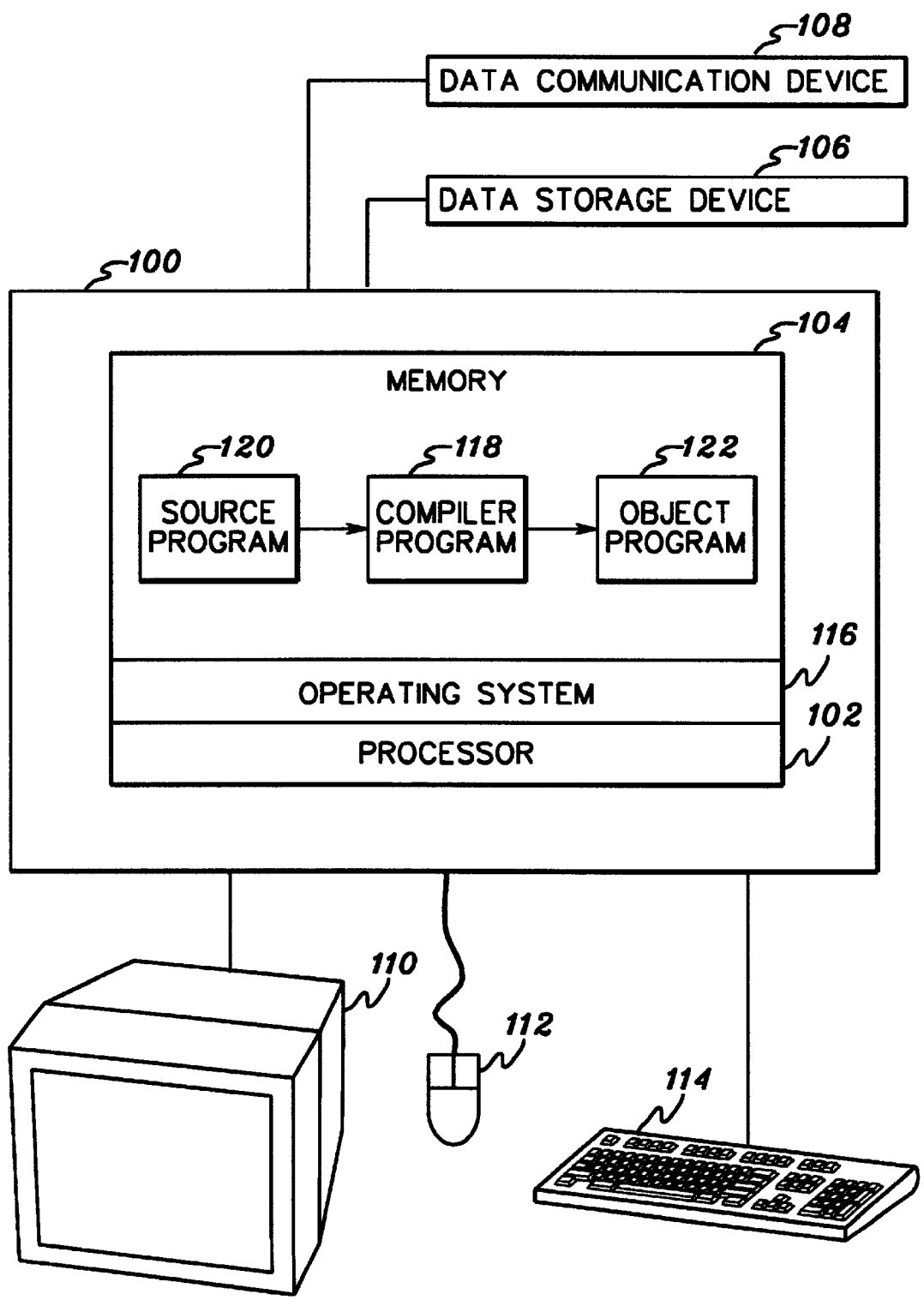
FIG. 1 is an exemplary hardware environment which can be used to implement the preferred embodiment of the present invention.

One example of a computer environment incorporating and using a diagnostics capability in accordance with the present invention is depicted in FIG. 1. Embodiments of the present invention may be implemented using a computer 100, which generally includes, inter alia, a processor 102, random access memory (RAM) 104, data storage devices 106 (e.g., hard, floppy, and/or CD ROM disk drives, etc.), data communications devices 108 (e.g., modems, network interfaces, etc.), monitor 110 (e.g., CRT, LCD display, etc.), mouse pointing device 112 and keyboard 114. It is envisioned that, attached to computer 100 may be other devices such as a read-only memory (ROM), a video card, bus interface, printers, etc. Those skilled in the art will recognize that any combination of the above components, or any number of different components, peripherals, and other devices, may be used with computer 100.

Computer 100 typically operates under the control of an operating system 116, such as the OS/390, AIX, or MVS operating systems offered by International Business Machines Corporation. Computer 100 may further operate under the control of a program, such as source or application program 120, to perform various tasks which may involve date-dependent information as described herein. The application program is compiled by a compiler 118, which is a computer program that translates the source program into an equivalent object-code program 122.

The source language may be, for example, a high-level language like COBOL, PL/I, C++, or a lower-level language such as ASSEMBLER, and the object language is the machine language of the computer. The translation of the source program into the object program occurs at compile-time, while the actual execution of an object program occurs at run-time.

A compiler must perform an analysis of the source program and then it must perform a synthesis of the object program, wherein it first decomposes the source program into its basic parts, and then builds the equivalent object program parts from the source program parts. As a source program is analyzed, information is obtained from, for example, procedural statements, such as loops and file I/O statements.

Compilers for the COBOL, PL/I, and C++ programming languages and assemblers are well-known in the art, as are run-time environments for a computer program based on these languages.

Figure 2:
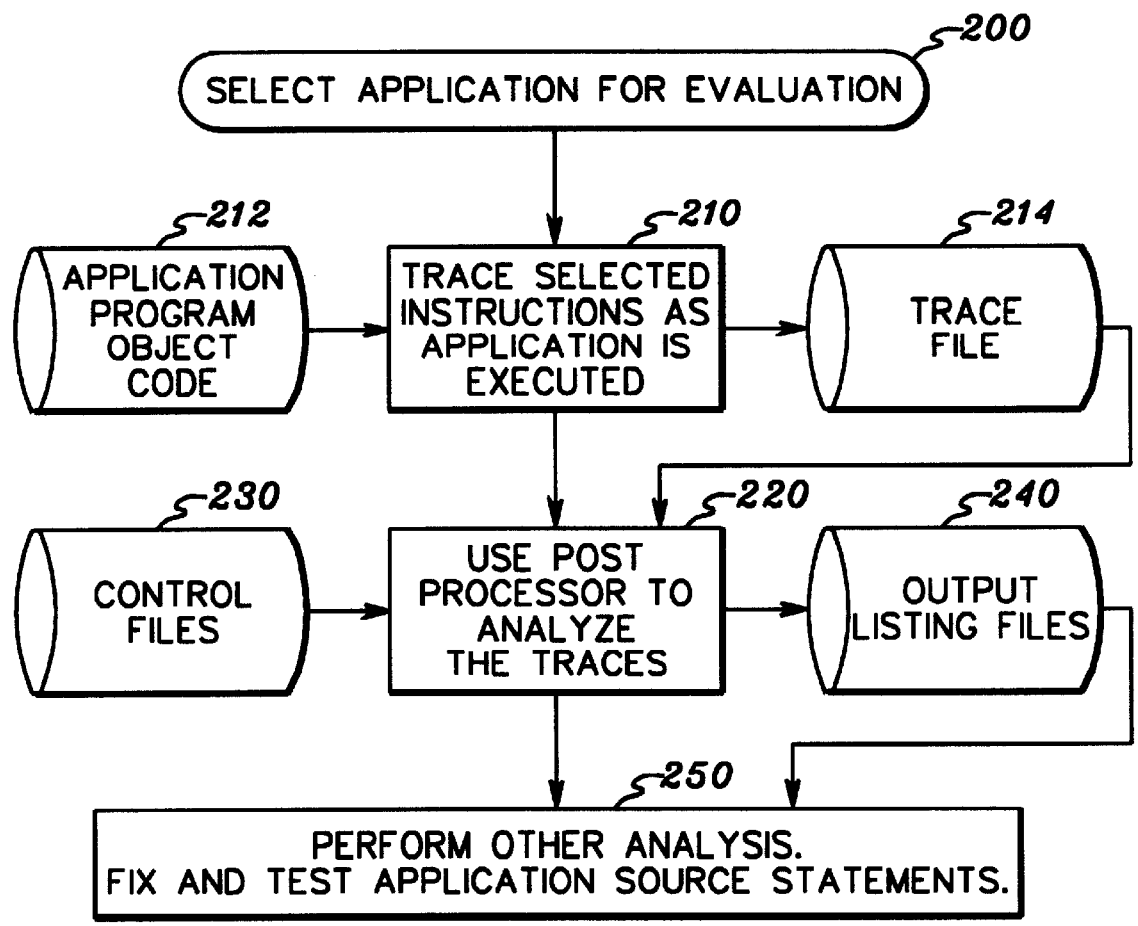
FIG. 2 depicts a process of one embodiment for identifying year-2000 problems in accordance with the present invention.

FIG. 2 presents one overall embodiment of a process for identifying year-2000 failures using analysis techniques in accordance with the present invention (herein comprising a mechanism referred to as the "post-processor"). Processing begins by a user or year-2000 remediation team selecting an application program for evaluation for y2k failures 200. A trace program is used to trace one or more selected instructions in the application program 210. The application program is provided in object-code format 212 and output of the trace processing produces a trace file 214.

Facilities that trace the execution of programs have existed for many years. Basic functions appeared with the "single-step mode", of early computers (e.g., the IBM S/360, Model 40) and the trace function of the IBM Virtual Machine Operating System. More recently, advanced facilities have been incorporated into tracing programs and machine hardware. Some recent developments are described by Thomas Ball and James R. Larus in "*Optimally Profiling and Tracing Programs*", Conference Record of the 19th ACM Symposium on Principles of Programming Languages, N.Y. ACM Press, 1992 (pages 59–70); by Jim Pierce and Trevor Mudge in "*IDtrace—a tracing tool for i486 Simulation*", Proceedings of the IEEE International Workshop on Modeling, Analysis, and Simulation of Computer and Telecommunications Systems 1994, IEEE Service Center, Piscataway, N.J. (pages 419–420); and U.S. Pat. No. 5,446,876, entitled "Hardware Mechanism for Instruction Data Tracing."

It is assumed, for the purposes of this document, that a trace program has observed the instruction-by-instruction execution of the compiled application program and written trace records for each selected instruction to a trace file. It is further assumed that the instructions mentioned in the description of the instruction selectors (described below) were traced. One of ordinary skill in the art can produce such a trace file using straightforward modifications to any one of a number of currently available tracing facilities.

The trace-output file contains one record for each execution instance of an instruction that is selected for tracing. Thus, if a selected compare logical (CLC) instruction is executed 1000 times, it produces 1000 trace records.

Preferably, the trace record for an instruction instance contains the instruction text, the register values used by the instruction, the values of the storage operands fetched by the instruction, the names of the load-module and control section (CSECT) for the program containing the instruction, and the offset of the instruction within its program. Concatenating the names with the program offset identifies the instruction for the purposes of the post-processor.

The trace record for a compare instruction also indicates whether the instruction is followed by a branch-on-equal or branch-on-not-equal.

The trace-output file is referred to as the "trace file" 214 in FIG. 2, where it is used as an input file for the post-processor 220.

In accordance with the present invention, year-2000 failures have been found to occur in subtract, compare, add and multiply instructions, and therefore, these instructions are initially selected for tracing. Along with trace file 214, control files 230 are provided to the post-processor for use in analyzing the traces 220. These control files allow a user to edit or set execution parameters for the post-processor run. For example, if the user knows that for a given application program end-of-century (EOC) dates must have occurred only after 1961, then end-of-century could be set to 61. Once the trace and control files are provided, the post-processor is invoked to analyze the trace records and predict which object-code instructions might fail when processing dates in the year-2000 (y2k) range. The post-processor is described further below in connection with FIGS. 3–8.

Post-processor output files 240 summarize the values processed by all the execution instances of each application instruction that is deemed, e.g., to have high year-2000 failure potential. Each instruction is assigned an identifier that references a catalog of failure-pattern descriptions. This post-processor output then requires further analysis by the year-2000 fix team to identify statements within the application source code that must be changed in order to bring the application into year-2000 compliance 250. The catalog of failure descriptors and the instruction summaries 240 provided by the post-processor (in accordance with this invention) are used in this step.

For example, the description for catalog identifier 1AB A is "the instruction exhibits both y2k-failure aspects and future-failure aspects in its execution instances." The instruction summary for such an instruction indicates its control section (CSECT) name and offset, and shows a histogram of the two-digit year (YY) values of the dates the instruction processed, the number of dates that are in the y2k range (00, 01, 02, . . . ), and the number of execution instances that matched a y2k-failure pattern. The fix team uses this information to locate the application source code statement that caused the instruction to be executed and determine that it must be changed to use a year-2000 remediation technique such as windowing or expansion to 4-digit years.

Again, the post-processor analyzes traces and predicts which instructions might fail when they process year-2000 dates. Instructions that process year-only (YY), Gregorian (YYMMDD, YY/MM/DD), or Julian (YYDDD, YY/DDD) dates containing two-digit-year values are flagged when the dates suggest actual or future failures in conformance with one of the following patterns. A y2k failure occurs when:

An instruction compares one date in an end-of-century (EOC) range (e.g., 41–99) to another date in a year-2000 (y2k) range (e.g., 00–04), and it is followed by a test for less-than, less-than-or-equal, greater-than, or greater-than-or-equal. This might happen, for example, when data-base records are being ordered by credit-card expiration date.

An instruction subtracts a number from a YY value in the y2k range, and the result crosses below 00. This might happen, for example, if 1 is subtracted from YY=00 or −1 is added to YY=00. If YY is a two-digit unsigned COBOL variable, the magnitude of the difference is stored (+01) instead of the value 99 that is needed by the program.

An instruction multiplies a YY value in the y2k range by 12, 365 or 36525 (representing 365.25). A year-2000 failure can occur when this is done to determine the number of months or days that have elapsed since a reference date, for example, when the reference date is Jan. 1, 1900 and YY is multiplied by 12, but YY=00 represents 2000.

An instruction compares a two-digit YY value to a constant value of 0 or 3. This occurs in routines that identify leap years by testing the remainder after dividing a year value by 4 or by handling YY=00 as a special case. Such routines must be examined to determine if the year 2000, which is a leap year, is handled properly.

A future y2k failure is suggested when:

An instruction compares two dates in an EOC range, and the instruction is followed by a test for less-than, less-than-or-equal, greater-than, or greater-than-or-equal. A year-2000 failure may occur in the future if the dates processed by the instruction subsequently (i.e., in future application runs) progress to the y2k range.

An instruction subtracts a number from a YY value in the EOC range. A year-2000 failure may occur in the future if the dates processed by the instruction progress to the y2k range.

An instruction multiplies a YY value in the EOC range by 12, 365 or 36525 (representing 365.25). A year-2000 failure may occur in the future if the dates processed by the instruction progress to the y2k range.

A post-processor in accordance with the present invention preferably recognizes true dates and nines-complement dates; Julian and Gregorian dates, with and without embedded separators; dates in zoned-decimal, packed-decimal, and binary formats; and dates contained in main-storage operands that are up to 18 bytes long.

Further, the user is preferably able to specify the y2k range, the EOC range, and the characters that are recognized as embedded separators within Julian and Gregorian dates. This is done based on knowledge of the applications that are to be analyzed.

A post-processing dilemma occurs in that attempting to identify all of the instructions that will fail, false-positives are also flagged. Thus, the post-processor preferably flags instructions that seem to have failure potential but that may not, in fact, fail when year-2000 dates appear. Some are in routines that have been made year-2000 ready using windowing, and others do not process dates at all (e.g., their values are pointers that range from 44 to 99). The post-processor assigns special flags to instructions that match a year-2000 failure paradigm, but whose inputs also fit the pattern of a known false positive.

In one embodiment, the flagging scheme uses "catalog ids" that reference items in an attribute catalog (e.g., see Table 1):

Catalog ids starting with "1" flag instructions that appear to process two-digit years (YY) and possess high year-2000 failure potential; ids starting with "2" suggest a somewhat lesser potential; and ids starting with "3" suggest few, if any, aspects predictive of year-2000 failure.

Ids whose second character is letter "A" or "B" indicate high year-2000 failure potential. Ids whose second character is "C"–"Z" indicate aspects of false positives in addition to year-2000 failure potential.

The third character of catalog identifiers whose second character is "A" distinguishes cases that already satisfy a year-2000 failure paradigm and cases that are predictive of a future y2k failure.

The fifth character of catalog ids that start with "1" or "2" indicates relatively how many instruction instances passed the set of tests called for by a specific filter, as is explained subsequently: letter "A" is all, "H" represents more than 92% (for example), and "L" more than 60% (again, for example). "H" or "L" suggests a year-2000 remediation issue since exception cases must be handled.

Using the above scheme, and Table 1, some examples of catalog identifiers are:

Catalog identifier "1AB A", which flags an instruction that exhibits both y2k-failure aspects and future-failure aspects in its execution instances. Catalog identifier "1AK A" indicates y2k-failure aspects but no future-failure aspects. And catalog identifier "1AF A" indicates future-failure aspects, but no y2k-failure aspects. All of these instructions have high y2k-failure potential.

"1AB A" flags an instruction whose operands were valid dates of a given type in all of its execution instances. However, catalog identifier "1AB H" indicates that in up to 8% of its instances the operand values were not valid dates of the type.

"1B00A" flags an instruction that compares a YY value to 0. If the comparison is made to avoid treating 00 as a leap year, and 00 now represents the year 2000 instead of 1900, then the wrong result is achieved. However, if it is made to ensure that 00 is treated as a leap year in remediated code, the correct result is achieved.

"1NECA" flags a compare instruction whose inputs are always in the range 00–79, never taking values in the 80–99 decades. This id is based on a false positive that was seen in a return-code comparison.

"1S31A" flags a subtract instruction that always subtracted one value from a value in the range 1–12, but never experiences a negative difference. This id is based on a false positive that was seen in a month calculation.

"2CEQA" flags a compare instruction that is followed by an equal or not-equal test. This instruction will not fail when confronted by year-2000 dates.

TABLE 1

| Id | Qualifying Attributes | Analysis |
|---|---|---|
| 1AB p | Some dates in the y2k and EOC ranges (e.g., 00–04 and 51–99). | Y2k failure aspects - already failing. |
| 1AK p | Some dates in y2k range, none in EOC range. | Y2k failure aspects - already failing. |
| 1AF p | No dates in y2k range, some in EOC range. | Future y2k failure if data progression continues. |
| 1B00p | Compare instruction, YY filter, and either op1 always 0 or op 2 always 0. | Test may avoid a y2k problem (remediated code) or may create one (eliminate 00 as leap year). |

TABLE 1-continued

| Id | Qualifying Attributes | Analysis |
|---|---|---|
| 1B03p | Compare instruction, YY filter, and either op1 or op2 always 3. | YY <= 3? May create a y2k problem (eliminate 00 as leap year). |
| 1B3Yp | Compare instruction, YY filter, and either (op1 = always 0 and op2 always <= 3) or (op2 = always 0 and op1 always <= 3). | Seen in leap-year determination, where the test is of module 4 and a test for YY = 00 handles 00 as a special case. |
| 1C2Kp | Compare, add, or subtract instruction; YY filter; and either op1 or op2 always = Y2K-LIMIT. | May indicate routine already remediated with window. |
| 1CDMp | Compare instruction and either (op1 >= 28 and op1 <= 31) or (op2 >= 28 and op2 <= 31). | Seen in days-in-month calculations. |
| 1NECp | Compare instruction and no values in the 80–99 decades. | Seen in return-code comparisons. |
| 1LECp | Compare instruction and <4% of the values in the 80–99 decades. | Seen in COBOL internal routines. |
| 1S12p | Subtract instruction and op1 always <= 12 | Seen in Gregorian month (MM) calculations. |
| 1SDMp | Subtract instruction and 28 <= op1 <= 31 | Seen in Gregorian day (DD) calculations. |
| 1S31p | Subtract instruction and op1 always <= 31 | Seen in Gregorian day (DD) calculations. |
| 1SNNp | Add or subtract instruction, op1 decades 00–19 empty, no negative results, and op2 = constant. Or add instruction, op2 decades 00–19 empty, no negative results, and op1 = constant. | No y2k failures (yet). Seen in pointer calculations. |
| 1ZMMp | Compare instruction, YY filter, and either (op1 = 0 and op2 <= 12) or (op2 = 0 and op1 <= 12). | One value always 0, the other always <= 12. Seen in month (MM) calculations. |
| 2CEQp | Compare instruction followed by BE or BNE, and not (catalog id = CY 00 or no catalog-id). | Compare for equal. No y2k failure. |
| 2KONp | Compare, add, or subtract instruction; both op1 and op2 constants. | No year-2000 failure aspects now. |
| 2N89p | Add or subtract instruction, op1 decades 80–99 empty, no negative results, and op2 = constant. Or add instruction, op2 decades 80–99 empty, no negative results, and op1 = constant. | No y2k failure aspects and no "YY" values above 80. Seen in segmenting calculations. |
| 2CTAp | Add instruction, YY filter, and either op1 or op2 = a negative constant. | Seen in COBOL table-referencing computations, but also may be a y2k failure. |
| 2S9CP | Subtract instruction and: YY filter and op1 always 99. Julian filter and op1 always 99999, or Gregorian filter and op1 always 999999. | Find the nines complement of a date. No y2k failure. |
| 3 | No catalog identifier assigned. | Few, if any, y2k failure aspects. |

Note:
A "p" at the end of an id stands for a letter that indicates how many instruction instances passed the filter: A for all, H for more than 92%; and L for more than 75%.

In view of the above, a post-processor in accordance with the present invention provides, via histograms of the year values actually taken by date variables, a planning tool that is useful in designing windowing solutions for the source code. For example, if the post-processor output for an application that is not yet faced with year-2000 dates shows that no date processed by the application falls before 1941, then YY=00–40 can be used to represent year-2000 dates.

Another set of advantages of the present invention derive from its "ease of use" and scope:

It runs as a normal TSO application on any IBM S/390 machine. Thus, many members of a remediation team can perform analysis runs at the same time.

It permits the user to affect the analysis by setting runtime control values that reflect individual aspects of the application being tested.

It assigns special flags that help to winnow out false positives instead of merely identifying instructions that seem to process date variables. This helps to expedite the analysis task that is left to the remediation team.

It identifies failures associated with performing arithmetic or comparisons on full Julian and Gregorian variables, instead of merely focusing on two-digit year variables. Thus, a wider set of failures can be identified.

It identifies failures in compare, subtract, add, and multiply instructions, as well as compare logical (CLC) instructions that compare zoned-decimal, packed-decimal, and binary operands. Again, a wider set of failures can be identified.

Figure 3:
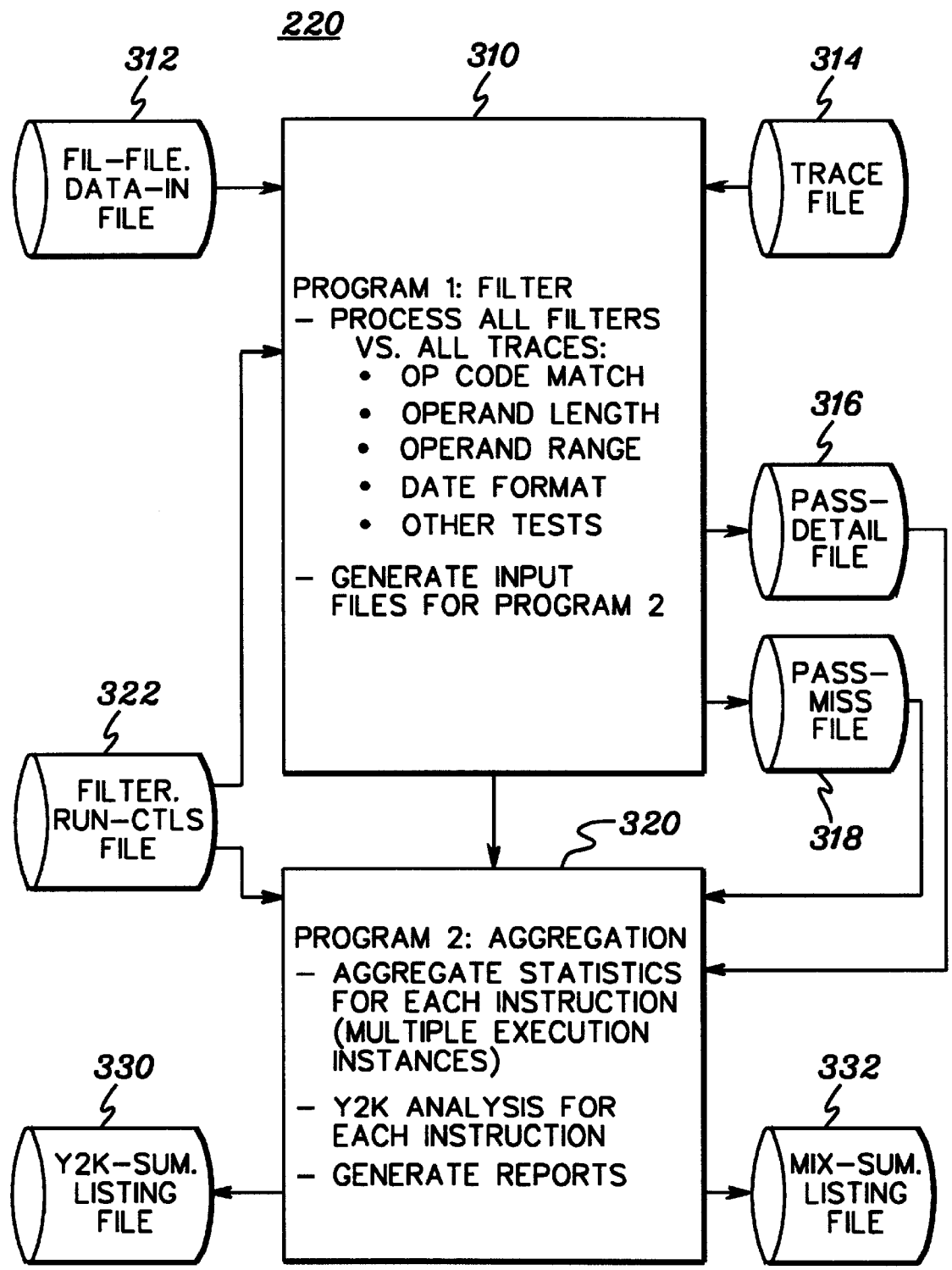
FIG. 3 depicts one embodiment of the post-processor analysis step of FIG. 2 in accordance with the present invention.

FIG. 3 presents one embodiment of a post-processor 220 in accordance with the present invention. Processor 220 includes a first, filter routine 310 and a second, aggregation routine 320 as described hereinbelow. Filter program 310 processes one or more filters and compares the filters to all trace records of the trace file. A filter may look for an op code match, an operand length, an operand range, a date format or other tests, and generates therefrom input files 316, 318 which are used for the aggregation program 320. The aggregation program analyzes these files and aggregates statistics for each instruction (i.e., assuming multiple execution instances). Specifically, y2k analysis for each instruction is performed and reports are generated.

By way of example, in one embodiment filter program 310 receives as input a FIL-FILE.DATA-IN file 312, as well as a FILTER.RUN-CTLS file 322, and a trace file 314 (as described above). The FIL-FILE.DATA-IN file and FILTER.RUN-CTLS file are described below.

FIL-FILE.DATA-IN

The filter-input file contains filter specification records. For example, the fields in each filter might be as discussed below.

RULE-ID and COMMENT: Bytes 2–17 AND 120–128 contain identifiers that are used in output files produced by the post-processor.

FILTER FLAGS: Bytes 19–26 contain the hex representation of 32 flags that specify the filtering rules. The flags are summarized in Table 2 below.

L1 LL and L1 UL: Bytes 28–29 and 31–32 contain decimal values that specify lower and upper limits on the lengths of first operands of compare logical (CLC) and decimal instructions. Instructions must have first operand lengths in this range in order to pass the filter.

L2 LL and L2 UL: Bytes 34–35 and 37–38 contain decimal values that specify lower and upper limits, respectively, on the lengths of second operands of decimal instructions. Instructions must have second operand lengths in this range in order to pass the filter.

OP1 LL and OP1 UL: Bytes 40–58 and 60–78 contain decimal values that specify lower and upper limits, respectively, on first operands. Instructions must have first-operand values in this range in order to pass the filter.

OP2 LL and OP2 UL: Bytes 80–98 and 100–118 contain decimal values that specify lower and upper limits, respectively, on second operands. Instructions must have second-operand values in this range in order to pass the filter.

Parameters set by the user can also affect the analysis produced by the post-processor. The parameters are placed into the input files.

For example, FILTER.RUN-CTLS might comprise a control file that contains the following values.

Y2K LIMIT: A decimal value (00–99) that defines a "y2k range." For example, using 04 causes YY values 00–04 to be recognized as representing 2000–04.

EOC LIMIT: A decimal value (00–99) that defines an "end-of-century range." For example, if the dates in a database of interest are all after 1940, setting EOC to 41 causes YY values 41–99 to be recognized as representing 1941–99.

TABLE 2

Filter Flags. The eight FILTER FLAG bytes, numbered 1–8, contain character representations for eight corresponding hex values. The valid characters are 0–9 and A–F, representing hex values 0–15.

Byte  Meaning

1  Filter type: indicates what type of instructions are passed by the filter. The values and types are:
   Value    Filter type 0    Compare instructions
   2    Multiply instructions
   4    CLC instructions that compare decimal numbers
   6    CLC instructions that compare binary numbers
   8    Subtract instructions
   C    Add instructions
2  Unused, must be 0.
3  Value tests: specifies tests to be performed. The four bits in the hex digit represented by the value-tests byte are divided into two sets of two bits each. The high-order two bits of the hex digit specify whether range testing, using the operand ranges specified by the filter (see "FIL-FILE.DATA-IN"), is done. The bit values are:
   Value    Range test 00    No operand range test is performed
   01    Test operand ranges according to the order specified by the filter.
   11    Test ranges using both the indicated order and also the reverse order.
   The low-order two bits of the hex digit specify when date testing is performed. The bit values are:
   Value    Date test 00    Test only operand 1 for dates.
   01    Test only operand 2 for dates.
   10    Test both operands for dates.
   11    Test that one operand is a date, but the other is not.
4  Date format: indicates the format of the values that allow an instruction to be passed by the filter. The values and formats are:
   Value    Date format 1    Two-digit years (YY)
   2    Gregorian dates containing two-digit years (YYMMDD)
   3    Julian dates containing two-digit years (YYDDD)
5  T/C selector: specifies whether true dates or nines-complement dates are passed:
   Value    True or nines-complement date 0    Pass true dates only.
   2    Pass nines complement dates only.
   3    Pass both.
   6    All-instructions flag.
   Value    Which instructions are tested 0    Instructions are tested according to the selector bits in bytes 7 and 8.
   1    All instructions corresponding to the filter type are tested.
7  Instruction selectors: The four bits in the hex digit, numbered 0–3 from left to right, are bit-significant controls which are interpreted according to the filter type. Bits 0 and 1 must be zero.

TABLE 2-continued

Filter Flags. The eight FILTER FLAG bytes, numbered 1–8, contain character representations for eight corresponding hex values. The valid characters are 0–9 and A–F, representing hex values 0–15.

Byte  Meaning

Bits 2 and 3 are:
   For compare-type filters:

Bit 2 = 1    Test compare logical (CL) instructions
   Bit 3 = 1    Test compare logical (CLR) instructions
   For subtract-type filters:

Bit 2 = 1    Test subtract logical (SL) instructions
   Bit 3 = 1    Test subtract logical (SLR) instructions
   For add-type filters:

Bit 2 = 1    Test add logical (AL) instructions
   Bit 3 = 1    Test add logical (ALR) instructions
   The four bits must all be zero for the other filter types.
8  Instruction selectors: The four bits in the hex digit, numbered 0–3 from left to right, are bit-significant controls which are interpreted according to the filter type.
   For multiply-type filters:

Bit 0 = 1    Test multiply decimal (MP) instructions
   Bit 1 = 1    Test multiply (M) instructions
   Bit 2 = 1    Test multiply (MR) instructions
   Bit 3 = 1    Test multiply (MH) instructions
   For compare-type filters:

Bit 0 = 1    Test compare decimal (CP) instructions
   Bit 1 = 1    Test compare (C) instructions
   Bit 2 = 1    Test compare (CR) instructions
   Bit 3 = 1    TeSt compare (CH) instructions
   For subtract-type filters:

Bit 0 = 1    Test subtract decimal (SP) instructions
   Bit 1 = 1    Test subtract (S) instructions
   Bit 2 = 1    Test subtract (SR) instructions
   Bit 3 = 1    Test subtract (SH) instructions
   For add-type filters:

Bit 0 = 1    Test add decimal (AP) instructions
   Bit 1 = 1    Test add (A) instructions
   Bit 2 = 1    Test add (AR) instructions
   Bit 3 = 1    Test add (AH) instructions
   For CLC-decimal-type filters:

Bit 0        Must be zero.
   Bit 1 = 1    Test CLC instructions with packed-decimal (PD) values
   Bit 2 = 1    Test CLC instructions with zoned-decimal (ZD) values
   Bit 3 = 1    Test CLC instructions with values containing Julian or Gregorian with imbedded separators (e.g., YY/MM/DD or YY–DDD).
   Bits 0–3 must be zeros for CLC-binary-type filters.

Continuing with FIG. 3, and as noted, filter program 310 provides input files for aggregation program 320. These files, which are labeled pass-detail file 316 and pass-miss file 318, designate whether a given instruction passed at least one filter or missed all of the predefined filters applied against the trace file. This pass-detail file and pass-miss file comprise the base data which is then used by aggregation program 320 to generate the y2k analysis for each instruction. This y2k analysis produces, in one embodiment, a y2k-SUM.LISTING file 330 and a MIX-SUM.LISTING file 332. These files are discussed below using samples from a test run. This test run analyzed a COBOL program, called Suite 15, that contains a concentration of date-processing routines.

Y2K-SUM.LISTING

FIG. 7 shows a file in accordance with the present invention that contains summaries for instructions that process two-digit years (YY) and that have high y2k-failure potential.

The display for the first instruction in the figure illustrates the summary contents:

The load-module and CSECT names are both SUITE15. The instruction is at CSECT offset SF68 (hex). It is a CLC that passed some fitter in 30 instances; in one instance its inputs caused rejection by all of the filters.

In 30 passing instances (96.8%), the instruction passed a filter that identifies comparisons of Gregorian dates. The inputs were true dates in packed decimal (PD) form. The catalog identifier assigned to the instruction for the filter is 1AB H (see Table 1).

The operand-1 range for the passing instances is 000227 to 991230. 20% the YY parts of the dates are in the 00–99 decade, 17% are in the 40–49 decade, 7% are in the 60–69 decade, and 57% are in the 90–99 decade. In addition, 20% of the YY values are in the y2k range (00–04 for the run).

The operand-2 range for the passing instances is 000227–950115. 60% of the YY values are in the 00–09 decade, with 3% in the 60–69 decade and 37% in the 90–99 decade. In addition, 60% of the YY values are in the y2k range.

In 12 instances, the instruction compared a date in the y2k range to a date in the EOC range ("Y2K failures=12"). In 11 instances, both dates were in the EOC range ("Fut Y2k failures=11"), thus suggesting additional y2k failures if the date progression continues.

The display for the second instruction shows:

A subtract decimal (SP) instruction passed a filter that identifies subtractions from two-digit-years in each of its 31 instances. The catalog identifier for the instruction is 1AB A.

The operand-1 range was 00–99. Operand 2 was always 1.

In four instances, subtracting produced a negative result (.Y2K failures=4"). In 23 other instances, the date was in the EOC range, suggesting more failures if the date progression continues.

The display for the third instruction in the figure shows:

A multiply decimal (MP) instruction passed a filter that identifies multiplications of two-digit-years (YY) by 12, 365, or 36525 in each of its 31 instances. The catalog identifier for the instruction is 1AB A.

The operand-1 range is 00–99. Operand 2 was always 36525. Six dates were in the y2k range ("Y2K failures= 6"). And 23 were in the EOC range.

The display for the last instruction shows:

A CLC instruction passed a filter that identifies comparisons of two-digit years (YY) in each of its 46 instances. The YY values were in zoned-decimal (ZD) form. The catalog id assigned to the instruction for the filter is 1B00A, indicating a compare to zero.

The operand-1 range is 00 to 99. In 15 cases, zero was compared to a date in the y2k range ("Y2K failures= 15").

MIX-SUM. LISTING

FIG. 8 shows a sample file in accordance with the present invention that contains summaries for instructions that might be processing two-digit years (YY), but that are cataloged as having a lesser year-2000 failure potential. These instructions are sometimes false positives.

The catalog identifier for the first instruction in the figure, 2N89A, flags a subtract instruction that produced no negative results and processed no dates in the 80–99 decade. Neither current nor future year-2000 failures are suggested.

The catalog identifier for the second instruction, 2KONA, flags a subtract instruction that produced no negative results and took constant values in its first and second operands. This operation is seen in subroutine return-code testing. Neither current nor future year-2000 failures are suggested.

The catalog identifier for the third instruction, 2S12A, flags an instruction that subtracted one from a value in the range 1–12. This operation is seen in month calculations, and it will not fail in year-2000 situations.

The catalog identifier for the last instruction, 2TACA, flags an instruction that added −2 to a value in the range 0–24. This operation is seen in COBOL table references, and it will not fail in year-2000 situations.

Post-Processor Logic

To summarize, FIG. 3 indicates that the post-processor has two subprograms. Subprogram 1 analyzes traces to produce working files that are used by Subprogram 2. Embodiments of each of these programs are presented in greater detail below.

Subprogram 1 (Filter)

Program 1, as shown in FIG. 3, processes a trace file produced as described above. Each record in the trace file summarizes execution values for one instance of an instruction. That is, an instruction at a given offset in a given CSECT and load module is generally executed, and therefore traced, many times.

Each record in the trace file is tested against each filter in the filter-input file (see "FIL-FILE.DATA-IN" above), using parameters taken from the run-control file (see "FILTER.RUN-CTLS" above) to determine whether the instruction and operand values recorded in the trace pass the tests specified by the filter.

The steps taken for each trace-filter pair are matching the instruction op code in the trace with the instructions specified by the filter, comparing the operand lengths in the trace (for a CLC or decimal instruction) to the length ranges specified by the filter, comparing the operand values in the trace to the operand ranges specified by the filter, determining whether the operand values are valid for the date format specified by the filter, and performing a special test appropriate to the instruction type. The instruction is said to pass the filter when there is an op-code match, the operand lengths and values are within the filter-specified ranges, the operand values are valid for the specified date-type, and any special test is passed; otherwise, the instruction is rejected by the filter.

The date-types and corresponding validity conditions are:

Two-digit year (YY): the operand-value V for the instruction instance is such that $0 \leq V \leq 99$.

Julian date with two-digit year (YYDDD, YY/DDD): the operand-value, when expressed as a decimal number VV . . . VDDD with three low-order digits DDD and two or more high-order digits VV . . . V, is such that $0 \leq VV \ldots V \leq 99$ and either $1 \leq DDD \leq 365$ or else DDD =366 if VV . . . V represents a leap year.

Gregorian date with two-digit year (YYMMDD, YY/MM/DD): the operand value, when expressed as a decimal number VV . . . VMMDD with two low-order digits DD, two intermediate digits MM, and several high-order digits VV . . . V, is such that $1 \leq MM \leq 12$, DD indicates a valid day number within the month whose number is MM, and $0 \leq VV \ldots V \leq 99$.

The validity determination is made by testing the operand value, whatever its length or format. For example, zoned-decimal value 75 is identified as valid for the two-digit-year format when the value is contained in an operand that is 2–18 bytes long. And binary value 75 is identified as valid when it is contained in a halfword, word, or double word operand.

The special test for a subtract instruction is to determine whether the first operand is non-negative and the second operand is positive; examples are where the first operand is 02 and the second is 1, the first operand is a Julian date 02101 and the second is 3000, or the first operand is a Gregorian date 000306 and the second is 1000. These are pre-conditions for a year-2000 failure that actually occurs when the difference between the two operands is negative.

The special test for an add instruction is to determine whether one operand is non-negative and the second is negative; examples are where the first operand is 02 and the second operand is −4, the first operand is a Julian date 02101 and the second is −2000. Or the first operand is a Gregorian date 020306 and the second is −50000. These are preconditions for a year-2000 failure that actually occurs when the sum of the two operands is negative.

The special test for a multiply instruction is to determine whether one operand is a two-digit-year value and the other is 12, 365, 36525, 120, 3650, 365250, 1200, 36 ,500, 3652500, . . .

No special test is performed in the other cases.

A record is written to the pass-detail file when the instruction passes the filter. The record identifies the instruction using its load-module and CSECT names, its offset within the CSECT, and its trace-file index; information derived from the filter and the trace record is also added. The load-module and CSECT names and the CSECT offset are derived from the trace record for the instruction; the trace-file index is the number of the record in the trace file. The other information includes:

The instruction text and operand values taken from the trace;

Indicators of which operands are dates, the year (YY) values derived from the dates, and an indication of whether the dates are in true or nines-complement form;

An indicator of whether the instruction and its operands match a y2k-failure paradigm or a future-y2k-failure paradigm;

For instructions that pass CLC-decimal filters, an indication of whether the operands are in packed-decimal (PD), zoned decimal (ZD), Julian-date-with separator (JS), or Gregorian-date-with-separator (GS) form;

For instructions that pass compare or CLC filters, an indication of whether the instruction was followed by a branch-on-equal or a branch-on-not-equal;

For instructions that pass subtract or add filters, an indication of whether the instruction produced a negative result; and The RULE-ID, filter type, date type, and COMMENT from the filter, and the index of the filter within the filter file.

Figure 4:
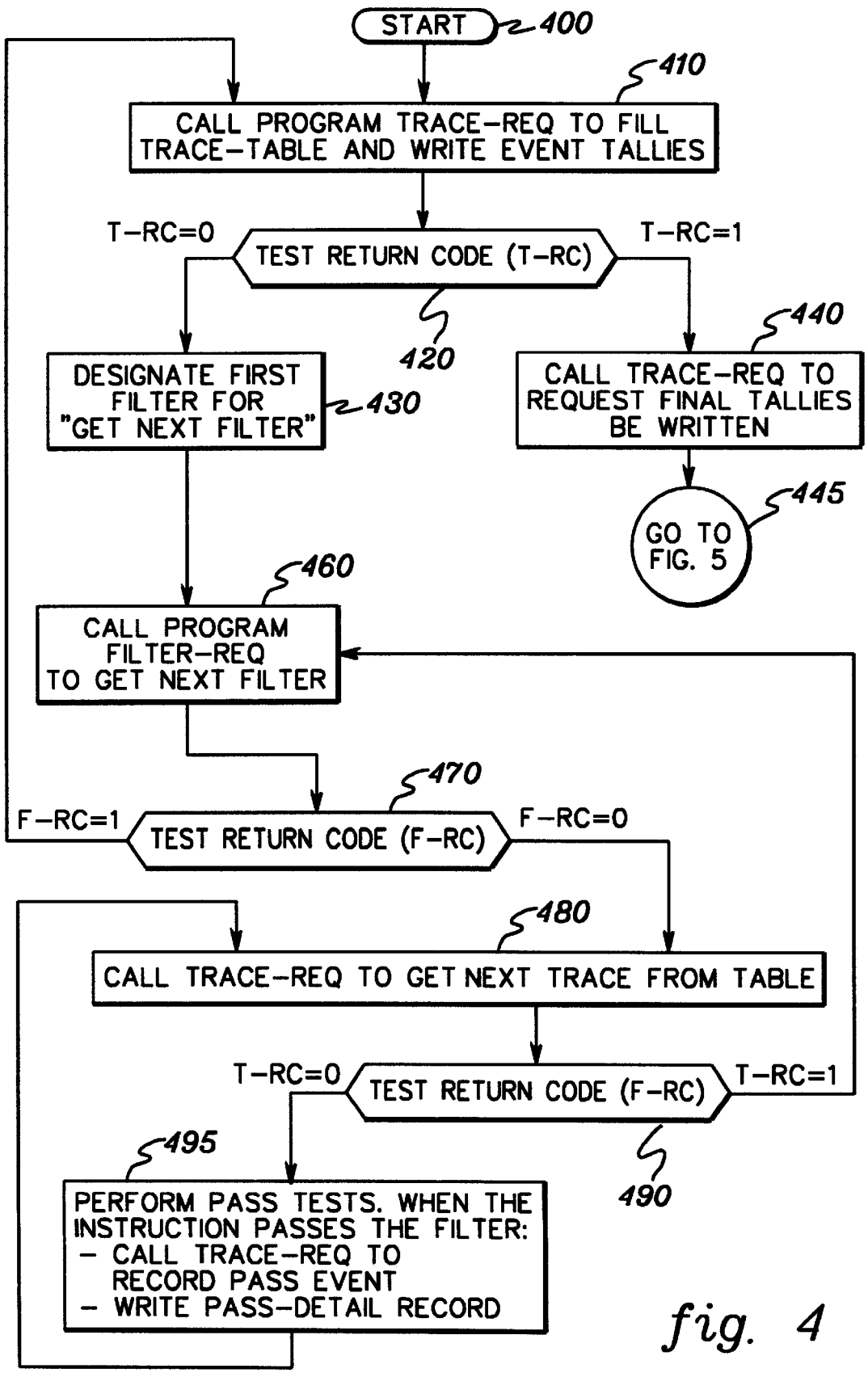
FIG. 4 is a flowchart of one embodiment of the filter program of FIG. 3.

FIG. 4 shows how all of the traces and filters are processed in accordance with one embodiment of the present invention.

Processing starts 400 by calling a program (TRACE-REQ) to manage the trace file and a TRACE-TABLE in main storage 410. The table contains slots that allow some number of traces (e.g., 256) to be copied to main storage for rapid access by the filter program. The called program has three major functions:

1. Fill the TRACE-TABLE: the next group of records is read from the trace file. Information derived from the trace records is placed in the TRACE-TABLE. A return code, T-RC, indicates whether records from the file have been placed in the table 420. T-RC is 0 when they have; T-RC is 1 when no records remain to be read from the file. When T-RC is 0, a pointer is set to cause the first record in the table to be returned when the next record is requested by the filter program 430.

This information is derived from the trace records:

The instruction location (load module name, CSECT name, and CSECT offset), the instruction text, and the trace-file index for the trace record.

The operand values for the instruction, three indications of whether the operands are valid dates in each of the standard date formats (see "Date format" in Table 2), and year values extracted from the operands for date formats that are valid. A value may be a valid date in more than one format. For example, the operand value 12 is a valid two-digit year (YY) as well as a valid Julian date (00012).

If the instruction is a CLC, indications of whether its operands are in packed-decimal, zoned-decimal, Julian-with-separator, or Gregorian-with-separator form.

If the instruction is a compare or a CLC, indication of whether or not it is followed by a branch-on-equal or a branch-on-not-equal test.

2. Supply the next trace in the TRACE-TABLE: the record is copied to a work area that is accessible to the filter program. T-RC is 0 when a record is supplied; T-RC is 1 when all of the traces were returned previously.

3. Record a pass event for the last trace that was returned. The called program tallies the number of filters that pass each trace in the TRACE-TABLE. When all of the traces in the table have been processed against all of the filters, as indicated by a request that the table be refilled by a new group of traces, the tallies are written to the pass-miss file 440. One record is placed in the pass-miss file for each trace in the table; the record identifies the instruction by its load-module and CSECT names, its CSECT offset, and its trace-file index. It also records the number of filters that passed the instruction; the number is zero when the instruction is rejected by all of the filters.

Another called program (FIL-REQ) supplies records from the filter file to the caller 460. The called program sets a return code, F-RC, to indicate whether a record has been resumed 470. F-RC is 0 when it has; and F-RC is 1 when no filters remain to be copied from the filter file.

The filter program starts off by entering the primary loop at its first step 400.

The primary loop in FIG. 4 starts with a call to TRACE-REQ to fill the TRACE-TABLE 410. When T-RC is 0 (420), indicating that traces have been copied to the TRACE-TABLE, Program 1 calls FILTER-REQ 430 to indicate that its next request for filter is to be satisfied starting from the beginning of the filter file. Otherwise, T-RC is 1 so the program is completed by calling TRACE-REQ to indicate that all of the final traces in the TRACE-TABLE have been processed 440 (whereupon processing proceeds to FIG. 5).

When T-RC is 0 (above), the filter program enters a secondary loop. The first step of the loop is to call FIL-REQ to return the next filter 460. When return code F-RC is 0, indicating that a filter was returned, Program 1 enters a tertiary loop that tests all of the traces in the TRACE-TABLE against the filter 480, 490. Otherwise, F-RC is 1, indicating that no filters remain, and the program returns to the top of the primary loop to fill the TRACE-TABLE with the next group of traces.

As noted, when F-RC is 0, Program 1 enters the tertiary loop, the first step of which is to call TRACE-REQ to fetch the next trace from the TRACE-TABLE 480. When T-RC is 1, indicating that all of the records in the TRACE-TABLE were returned previously, Program 1 returns from testing the return code 490 to the first step in the secondary loop to get the next filter 460; otherwise, T-RC is 0, indicating that a trace record was returned, so Program 1 performs pass tests for the current filter and current trace 495. When the instruction passes the filter, TRACE-REQ is called to record the pass event and a record is written to the pass-detail file, as described above. Then, Program 1 returns to the first step of the tertiary loop.

Subprogram 2 (Aggregation)

Subprogram 2 (herein "Program 2") as shown in FIG. 3, processes the pass-miss and pass-detail files from Program 1 in order to summarize the results, for each instruction, of all of its execution instances. The summaries are placed in the output files described above.

Figure 5:
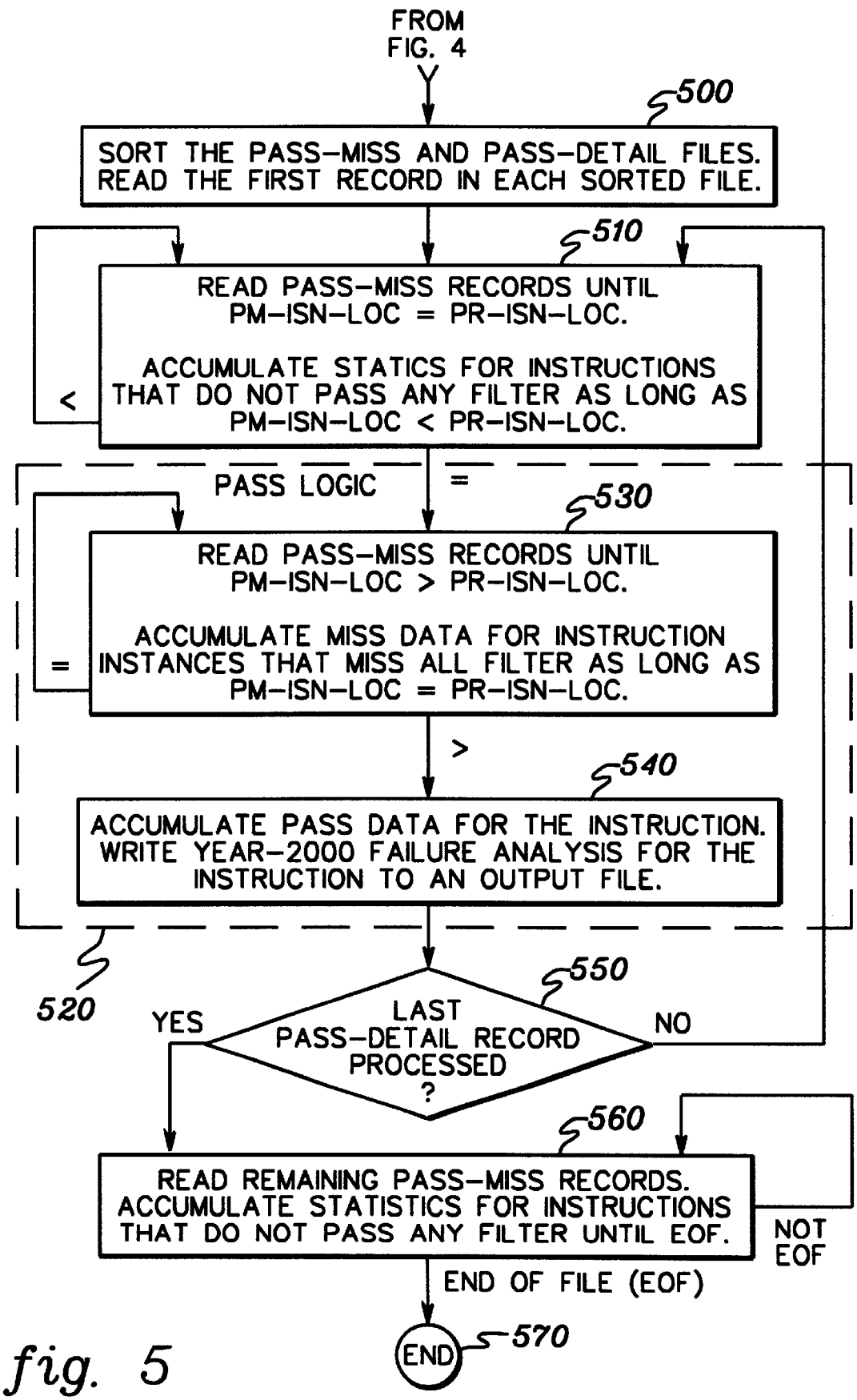
FIG. 5 is a flowchart of one embodiment of the aggregation program of FIG. 3.

Details on Program 2 are shown in FIG. 5. Program 2 starts by sorting the pass-miss and pass-detail files to prepare for a "sort-merge-join" operation 500. The pass-miss records are sorted by ascending instruction location; the pass-detail records are sorted by ascending instruction location and trace-file index. The instruction location is the concatenation of a load-module name, CSECT name, and offset within the CSECT. Thus, all execution instances of the same instruction are grouped into consecutive records of the sorted files.

The first records of the sorted pass-miss and pass-detail files are read into main storage in preparation for entering the primary loop of FIG. 4. The pass-detail record is called the current pass-detail record, and the instruction represented by that record is called the current instruction in the following description.

The first step in the primary loop is to read pass-miss records until the instruction location in a pass-miss record (PM-ISN-LOC) is equal to the instruction location in the current pass-detail record (PR-ISN-LOC) 510. When the two are not equal, the instruction instance represented in the pass-miss record has not passed any filter. Counters for the number of such unique instructions (NUM-ISN-NFIL) and the number of misses for all of the instances of such instructions (NUM-MIS-NFIL) are accumulated. A new instruction is recognized when the instruction location in the pass-miss records changes.

The next step is to read further pass-miss records until the instruction location in a pass-miss record is greater than the instruction location in the current pass-detail record 530. When the pass count in a pass-miss record having the same instruction location as the current pass-detail record is zero, indicating an instance of the current instruction that did not pass any filter, a counter for the number of misses for the current instruction (NUM-MISS) is incremented.

Next, all of the pass-detail records for the same instruction location as the current instruction are processed, as is explained below with reference to FIGS. 6a & 6b, to accumulate pass data for all execution instances of the instruction and to write certain file records 540.

Execution in the primary loop ends if the last pass-detail record has been processed 550; otherwise, execution returns to the first step of the primary loop 510.

When the primary loop in FIG. 3 has been completed, any remaining records in the pass-miss file represent other instructions that did not pass any filter. The records are read, until an end-of-file (EOF) condition is encountered, and counters for the number of such instructions (NUM-ISN-NFIL) and the number of misses for all of the instances of such instructions (NUM-MISS-NFIL) are incremented, based on the record contents 560. Once again, a new instruction is recognized when the instruction location in the pass-miss records changes.

Program 2 ends 570 when the last record in the pass-miss file has been processed.

Figure 6A:
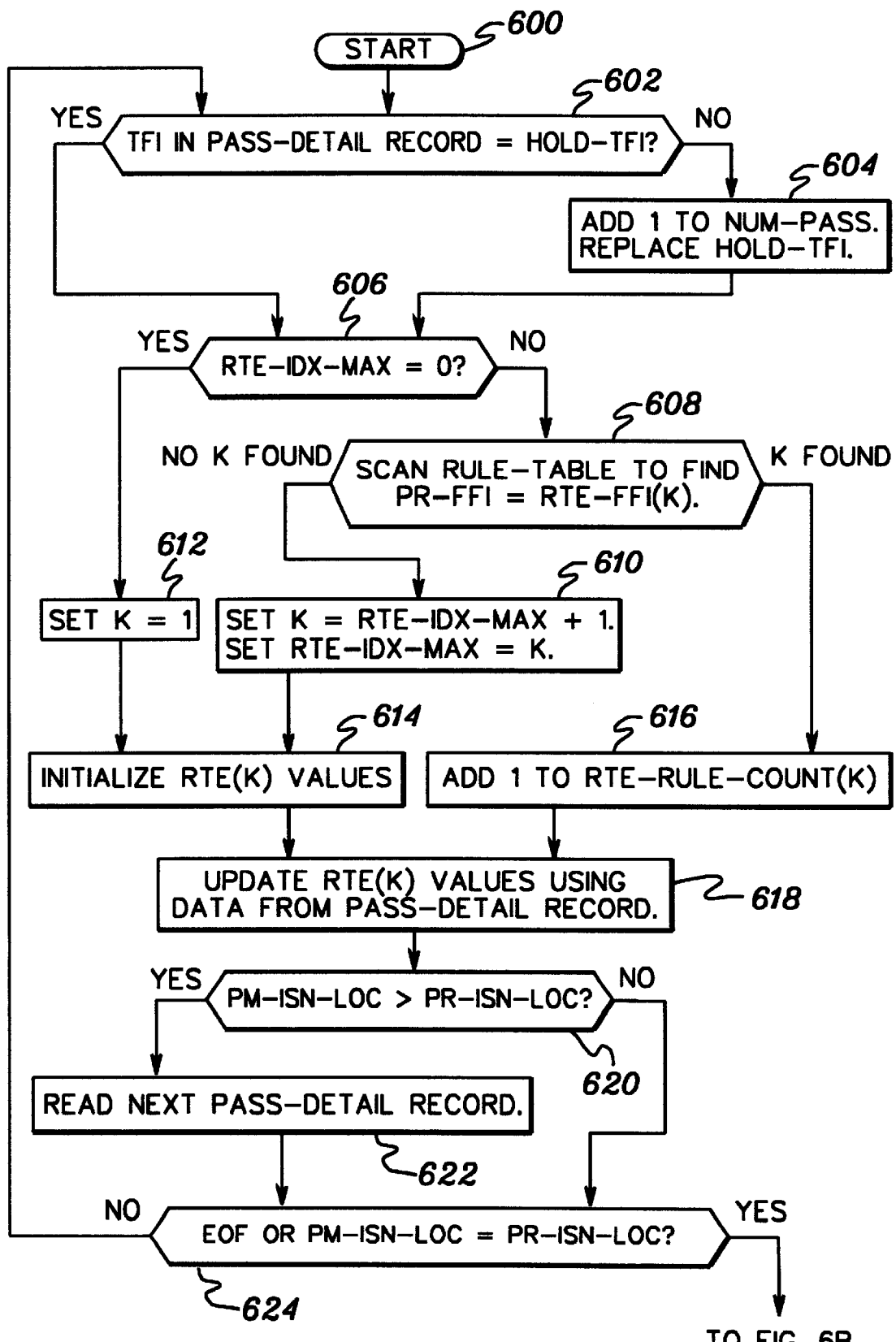
FIGS. 6a & 6b are a flowchart of one embodiment of the pass logic employed in the aggregation program of FIG. 5.
Figure 6B:
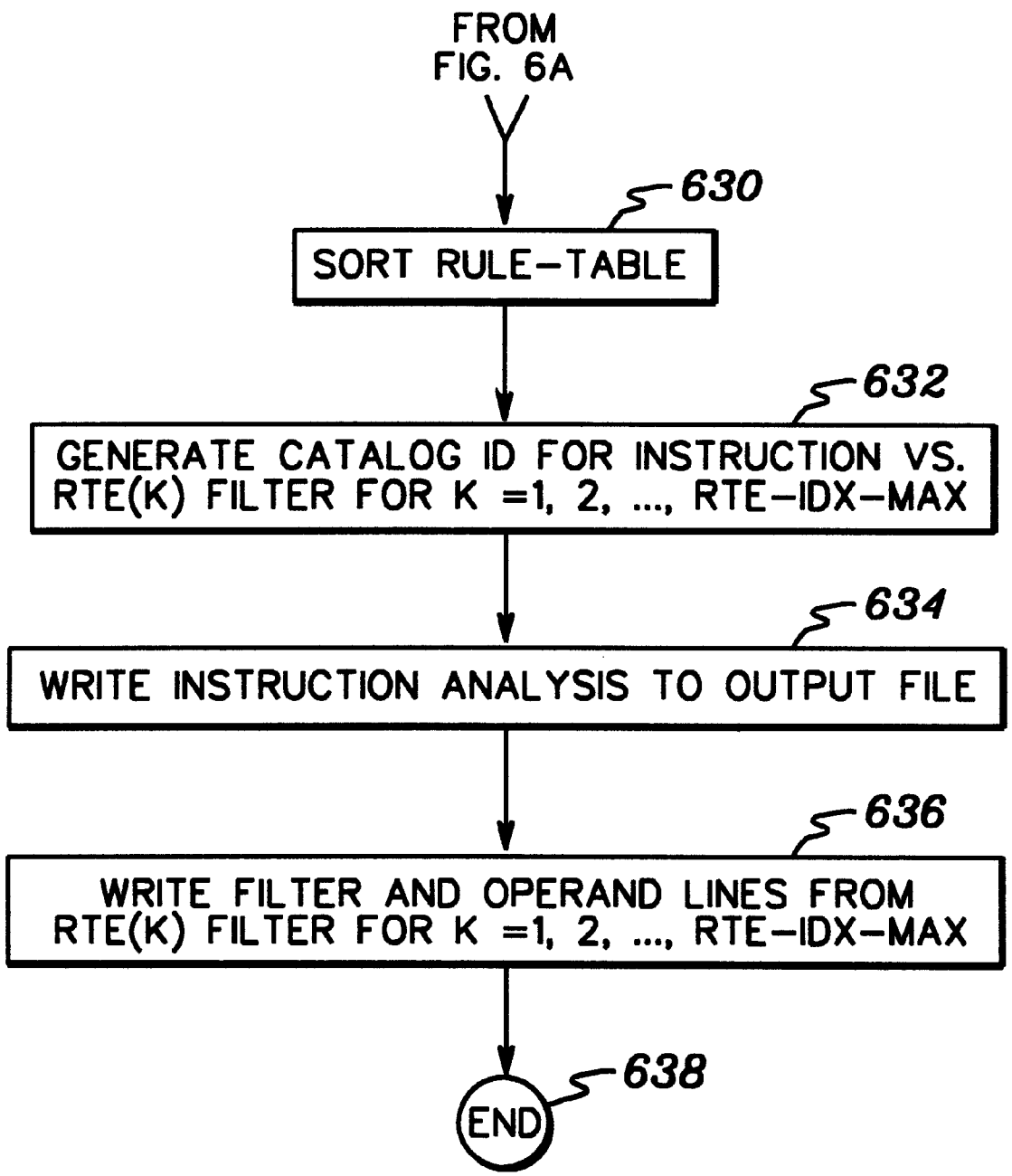

FIGS. 6a & 6b show more details on a specific aspect of Program 2; that is, the program fragment 520 of FIG. 5 that accumulates information about all execution instances of an individual instruction in a RULE-TABLE. Entries in the RULE-TABLE are made to correspond to filters that passed the instruction. Each entry contains counters and other fields where maximum and minimum values are derived.

First, the variable HOLD-TFI is initialized to all zeros. HOLD-TFI is used to determine when the pass-detail records for a new instruction instance start.

The first loop of FIG. 6a starts 600 by comparing the trace-file index (TFI) in the current pass-detail record to HOLD-TFI 602. When they are not equal, a new execution instance of the current instruction has been encountered, so one is added to a counter (NUM-PASS) for the number of instances of the current instruction that have passed some filter, and the TFI from the pass-detail record replaces the previous HOLD-TFI value 604.

Next, values from the pass-detail record are used to update the RULE-TABLE entry assigned for the filter whose filter-file index (FFI) is designated in the record. There are three cases to consider:

The RULE-TABLE is empty (RTE-IDX-MAX, which designates the highest numbered entry that is in use, is zero 606): The first entry in the table is selected ("Set K=1") 612, and the values in entry RTE(K) are initialized by copying the FFI value in the pass-detail record to a field within the entry, setting the counter RTE-RULE-COUNT{K) to one, resetting other counters in the entry to zero, and copying the operand values from the pass-detail record to operand-maximum and operand-minimum variables in the entry 614.

The RULE-TABLE is not empty (RTE-IDX-MAX is not zero), but none of the entries in the table has been assigned to accumulate information for filter FFI 608. The next unused entry is selected ("Set K=RTE-IDX-MAX+1" and "Set RTE-IDX-MAX=K") 610, and the values in entry RTE(K) are initialized 614 as is described above.

Entry K in the table has already been assigned to accumulate information for filter FFI 608. One is added to counter RTE-RULE-COUNT(K), which tallies the number of instances of the current instruction that were passed by the filter 616.

In any case, values from the pass-detail record are used to update counters and operand-range values in entry RTE(K) 618, as follows:

For instructions that pass subtract or add filters, add one to counter RTE-NR-NUM(K) if the instruction produced a negative result.

For instructions that pass CLC-decimal filters, use the indication of whether the operands are in packed-decimal (PO), zoned-decimal (ZD), Julian-date-with-separator (JS), or Gregorian-date-with-separator (GS) form to add one to counter RTE-PD-NUM(K), RTE-ZD-NUM(K), RTE-JS-NIJM(K), or RTE-GS-NUM (K), as appropriate.

Use the indication of whether the dates processed by the instruction are in true or nines-complement form to add one to counter RTE-T-DATE(K) or RTE-C-DATE(K), respectively.

Determine the decades of the operand YY values, and add one to the appropriate decade counters. The counters are used in forming histograms.

Use the operand YY values to add one to "y2k range counters" for operands 1 and 2 when the YY values are in the y2k range.

Update the maximum and minimum values for operands 1 and 2, as appropriate. For example, if the operand 1 value in the pass-detail record is larger than the present maximum for operand 1, use the larger value to replace the present maximum.

After entry RTE(K) is updated, a test is made to determine whether the instruction location in the pass-miss record is greater than the instruction location in the pass-detail record 620; if so, the next pass-detail record is read and becomes the current pass-detail record 622.

The last step in the loop is to return to the start of the loop when the last record in the pass-detail file has not been read and the instruction location in the pass-miss record is not equal to the instruction location in the current pass-detail record 624. Otherwise, execution continues as shown in FIG. 6b.

As shown in FIG. 6b, the first step is to sort the RULE-TABLE elements by descending RTE-RULE-COUNT 630. The element for the filter that recorded the greatest number of passes for the current instruction appears first, the element for the next highest number of passes is next, and so on.

The second step is to process each element of the sorted RULE-TABLE in turn. The information in each rule-table element (RTE) is used to generate a catalog id for the instruction-filter pair according to Table 1 632.

Next, processing writes a record identifying the instruction to file Y2K-SUM.LISTING or MIX-SUM.LISTING 634. The file is determined using the catalog id recorded in variable RTE-CAT(1); that is, the id assigned for the filter that passed the instruction most frequently. The record contains the instruction location and text; and also indicates how many instruction instances were passed by some filter and how many were rejected by all of the filters. By way of example, see FIGS. 7 & 8.

The last step of FIG. 6b also processes each element of the sorted RULE-TABLE. In particular, information in each element is used to generate a related set of records for the same instruction-analysis file as above 636. In one embodiment, the information included in each related set of records is as follows:

The catalog id assigned to the instruction for the filter whose FFI value is RTE-FFI(K); the RULE-ID and COMMENT from the filter, its FFI value, and an indication of what percentage of the instruction instances passed the filter.

For compare and CLC instructions, an indication of how many execution instances processed true dates and nines complement dates; for CLC instructions, an indication of how many instruction instances processed packed-decimal (PD), zoned-decimal (ZD), Julian-with-separator (JS), and Gregorian-with-separator (GS) dates.

The range of values taken by operand 1 of the instruction across all of the instances that passed the filter; a histogram showing the decade populations, in percent of the total, for the year (W) values extracted from operand 1 for all of the passing instances; and the percent of the YY parts of the operand 1 values that fell into the y2k range. Similarly for operand 2.

An indication of how many execution instances satisfied the year-2000-failure pattern for the instruction, and how many others satisfied the future-year-2000 failure pattern.

Thereafter, processing of the pass logic is complete 638.

Those skilled in the art will note that the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as part of a computer system or sold separately.

The flow diagrams depicted herein are exemplary. There may be other variations to these diagrams or the steps (or operations described herein) without departing from the spirit of the invention. For instance, the steps may be performed in differing order, or steps may be added, deleted, or modified. All these variations are considered a part of the claimed invention.

Although preferred embodiments have been depicted and described in detail herein, it will be apparent to those skilled in the art that various modifications, additions, substitutions and the like can be made without departing from the spirit of the invention and these are therefore considered to be within the scope of the invention as defined in the following claims.

What is claimed is:

1. An article of manufacture comprising:
   at least one computer usable medium having computer readable program code means embodied therein for causing evaluating of instructions of an application program, the computer readable program code means in said article of manufacture comprising:
   (i) computer readable program code means for causing a computer to effect evaluating an instruction of said application program to identify whether said instruction may fail when confronted with a year-2000 date, said evaluating including employing execution characteristics embodied by at least one trace record of said instruction in a trace file produced from execution of said instruction; and
   (ii) computer readable program code means for causing a computer to effect assigning a failure-pattern descriptor to said instruction of said application program if said evaluating determines that said instruction may fail when confronted by said year-2000 date, said failure-pattern descriptor being useful in bringing said application program into year-2000 compliance.

2. The article of manufacture of claim 1, wherein said instruction comprises one of a subtract, a compare, an add and a multiply instruction.

3. The article of manufacture of claim 1, wherein said computer readable program code means for causing a computer to evaluate comprises computer readable program code means for causing a computer to compare said at least one trace record to a predefined instruction failure pattern.

4. The article of manufacture of claim 3, wherein said predefined instruction failure pattern comprises a pattern representative of at least one of:
   (i) a compare instruction having one date in an end-of-century (EOC) range and another date in a year-2000 (y2k) range, and said compare instruction is followed by a test for less-than, less-than-or-equal, greater-than, or greater-than-or-equal;
   (ii) a subtract instruction which subtracts a number from a two-digit value in the y2k range and the result crosses below 00;
   (iii) a multiply instruction having a two-digit value in the y2k range multiplied by 12, 365, or 36525; and
   (iv) a compare instruction which compares a two-digit value to a constant value of 0 or 3.

5. The article of manufacture of claim 3, wherein said computer readable program code means for causing a computer to evaluate further comprises computer readable program code means for causing a computer to compare said at least one trace record to a future failure pattern, said future failure pattern comprising a pattern representative of at least one of:

(i) a compare instruction having two dates in an end-of-century (EOC) range, and said compare instruction is followed by a test for less-than, less-than-or-equal, greater-than, or greater-than-or-equal, and wherein at least one date of said two dates in said EOC range may progress to a year-2000 (y2k) range;

(ii) a subtract instruction which subtracts a number from a YY value in the EOC range, wherein a year-2000 failure may occur in the future if the YY value processed by said subtract instruction may progress to the y2k range; and (iii) a multiply instruction with a YY value in the EOC range which is multiplied by 12, 365 or 36525, wherein a year-2000 failure may occur in the future if the result of the multiply instruction progresses to the y2k range.

6. The article of manufacture of claim 3, wherein said predefined instruction failure pattern comprises one of a compare instruction or a compare logical (CLC) instruction, followed by a branch-on-equal or branch-on-not-equal instruction.

7. The article of manufacture of claim 1, wherein said execution characteristics comprise dates in at least one of an end-of-century (EOC) range or a year-2000 (y2k) range.

8. The article of manufacture of claim 7, wherein said dates can be represented as true two-digit dates, nines-complement dates, Julian dates, Gregorian dates, with or without embedded separators, zoned-decimal dates, packed-decimal dates, binary formatted dates, or dates contained within operands up to 18 bytes long.

9. The article of manufacture of claim 1, wherein said failure-pattern descriptor comprises a catalog identifier comprising one of a plurality of catalog identifiers, each catalog identifier of said plurality of catalog identifiers providing at least one of a probability of instruction failure when confronted with a year-2000 date or an indication of possible false-positive failure when confronted by said year-2000 date.

10. The article of manufacture of claim 9, wherein said catalog identifier comprises a multi-byte identifier which includes a first byte indicative of year-2000 failure potential, a second byte indicative of year-2000 failure potential or an aspect of a possible false-positive in addition to year-2000 failure potential, a third byte indicative of whether an instruction satisfies a predefined year-2000 failure pattern and is predictive of a future y2k failure, and a fourth byte indicative of how many instances of execution of said instruction passed a predefined year-2000 failure pattern.

11. The article of manufacture of claim 1, wherein said computer readable program code means for causing a computer to evaluate includes computer readable program code means for causing a computer to employ multiple trace records of said instruction in said trace file produced from multiple executions of said instruction.

12. The article of manufacture of claim 11, wherein said computer readable program code means for causing a computer to evaluate comprises computer readable program code means for causing a computer to evaluate multiple instructions of said application program to identify whether any of said multiple instructions fail when confronted with said year-2000 date, and wherein said computer readable program code means for causing a computer to assign comprises assigning a failure-pattern descriptor to each of said instructions of said application program that may fail when confronted by said year-2000 date.

13. The article of manufacture of claim 12, wherein said year-2000 date comprises a range of year-2000 dates.

14. The article of manufacture of claim 1, wherein said instruction comprises an object-code instruction.

15. An article of manufacture comprising:

at least one computer usable medium having computer readable program code means embodied therein for causing evaluating of instructions of an application program, the computer readable program code means in said article of manufacture comprising:

(i) computer readable program code means for causing a computer to effect evaluating an instruction of said application program to identify whether said instruction may fail when confronted with a year-2000 date;

(ii) computer readable program code means for causing a computer to effect determining whether said instruction has a characteristic of a predefined false-positive pattern; and (iii) computer readable program code means for causing a computer to effect assigning a failure-pattern descriptor to said instruction of said application program if said computer readable program code means for causing a computer to effect evaluating determines that said instruction may fail when confronted by said year-2000 date, wherein said failure-pattern descriptor is indicative of a possible false-positive instruction when said computer readable program code means for causing a computer to effect determining determines that said instruction has said characteristic of said predefined false-positive pattern, wherein said failure-pattern descriptor is useful in bringing said application program into year-2000 compliance.

16. The article of manufacture of claim 15, wherein said predefined false-positive pattern comprises one pattern of multiple predefined false-positive patterns, and wherein said computer readable program code means for causing a computer to determine comprises computer readable program code means for causing a computer to determine whether said instruction has at least one characteristic representative of any of said multiple predefined false-positive patterns.

17. The article of manufacture of claim 15, wherein said computer readable program code means for causing a computer to evaluate comprises computer readable program code means for causing a computer to employ execution characteristics embodied by at least one trace record of said instruction in a trace file produced from execution of said instruction.

18. The article of manufacture of claim 17, wherein said execution characteristics comprise dates in at least one of an end-of-century (EOC) range or a year-2000 (y2k) range, and wherein said dates are represented as at least one of true dates, nines-complement dates, Julian dates, Gregorian dates, with or without embedded separators, zoned-decimal dates, packed-decimal dates, binary formatted dates, or dates contained within operands up to 18 bytes long.

19. The article of manufacture of claim 15, wherein said failure-pattern descriptor comprises a catalog identifier comprising one of a plurality of catalog identifiers, each catalog identifier of said plurality of catalog identifiers providing at least one of a probability of instruction failure when confronted with a year-2000 date or an indication of a possible false-positive.

20. The article of manufacture of claim 15, wherein said computer readable program code means for causing a computer to evaluate includes computer readable program code means for causing a computer to analyze an operand of said instruction, and wherein said article of manufacture further comprises providing based on said computer readable program code means for causing a computer to analyze at least one of a data histogram, a year-2000 data count, a year-2000 failure count, and a possible future year-2000 failure count.

21. The article of manufacture of claim 15, wherein said instruction comprises one of a subtract, a compare, an add and a multiply instruction, and wherein said instruction comprises an object-code instruction.

22. An article of manufacture comprising:
    at least one computer usable medium having computer readable program code means embodied therein for causing evaluating of object-code instructions of an application program, the computer readable program code means in said article of manufacture comprising:
    (i) computer readable program code means for causing a computer to effect providing at least one of a run-control value and a filter-specification value for use in evaluating an object-code instruction of said application program; and
    (ii) computer readable program code means for causing a computer to effect evaluating said object-code instruction of said application program to identify whether said instruction may fail when confronted with a year-2000 date, said evaluating including employing said at least one of said run-control value and said filter-specification value in determining whether said instruction may fail when confronted with said year-2000 date.

23. The article of manufacture of claim 22, wherein said computer readable program code means for causing a computer to provide comprises computer readable program code means for causing a computer to provide said run-control value, and wherein said run-control value comprises at least one of a year-2000 (y2k) range and an end-of-century (EOC) range.

24. The article of manufacture of claim 22, wherein said computer readable program code means for causing a computer to provide comprises computer readable program code means for causing a computer to provide said filter-specification value, and wherein said filter-specification value comprises a value to specify at least one of date formats of said instruction that are to be tested for, or valid operand lengths and ranges for said instruction.

25. The article of manufacture of claim 24, wherein said specified date format comprises at least one of a two-digit year, a Julian date, or a Gregorian date.

26. The article of manufacture of claim 22, wherein said computer readable program code means for causing a computer to provide comprises computer readable program code means for causing a computer to provide said filter-specification value, and wherein said filter-specification value comprises an indication of a type of instruction within said application program to be tested, wherein said instruction comprises said type of instruction.

27. The article of manufacture of claim 22, wherein said computer readable program code means for causing a computer to evaluate comprises computer readable program code means for causing a computer to employ execution characteristics embodied by at least one trace record of said instruction in a trace file produced from execution of said instruction, and wherein said article of manufacture further comprises computer readable program code means for causing a computer to assign a failure-pattern descriptor to said instruction if said evaluating determines that said instruction may fail when confronted by said year-2000 date.

* * * * *

UNITED STATES PATENT AND TRADEMARK OFFICE
CERTIFICATE OF CORRECTION

PATENT NO.   : 6,253,336 B1
DATED        : June 26, 2001
INVENTOR(S)  : Moore

It is certified that error appears in the above-identified patent and that said Letters Patent is hereby corrected as shown below:

Column 1,
Lines 17 and 18, delete "INSTRUCT ON" and insert -- INSTRUCTION --

Signed and Sealed this

Twenty-fifth Day of June, 2002

*Attest:*

*Attesting Officer*

JAMES E. ROGAN
*Director of the United States Patent and Trademark Office*